United States Patent [19]

Russo

[11] 4,442,562

[45] Apr. 17, 1984

[54] METHOD OF FORMING ANCHOR BOLTS

[76] Inventor: Peter J. Russo, 719 Nut Plains Rd., Guilford, Conn. 06437

[21] Appl. No.: 375,804

[22] Filed: May 7, 1982

[51] Int. Cl.³ .............................................. B21K 1/74
[52] U.S. Cl. .................................................. 10/27 R
[58] Field of Search ............ 10/27 R, 27 FS, 27 PH, 10/20.5; 29/416; 411/75, 76, 77, 78, 79, 80

[56] References Cited

U.S. PATENT DOCUMENTS

| | | | |
|---|---|---|---|
| 1,111,749 | 9/1914 | Joseph | 10/27 PH |
| 1,424,539 | 8/1922 | Wilcox | 10/27 PH |
| 3,352,193 | 11/1967 | Lerich | 411/80 X |

FOREIGN PATENT DOCUMENTS

| | | | |
|---|---|---|---|
| 1143772 | 2/1963 | Fed. Rep. of Germany | 411/75 |
| 1294271 | 3/1964 | France | 411/80 |

Primary Examiner—E. Michael Combs
Attorney, Agent, or Firm—Walter Spruegel

[57] ABSTRACT

The outer prongs and inner expander of an anchor bolt are formed from a cylindrical metal blank with an axis, by lengthwise cutting the blank in planes which subtend different parts of the blank periphery and are inclined inwardly toward one end of the blank at identical wedge angles to the axis, whereby the blank is divided into separate prongs and a common expander, with the prongs and expander having plane companion wedge faces, respectively, and the prongs having cylindrical gripping surfaces.

5 Claims, 14 Drawing Figures

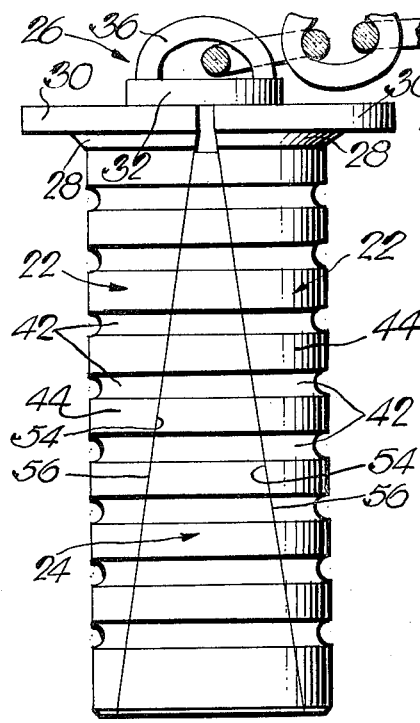
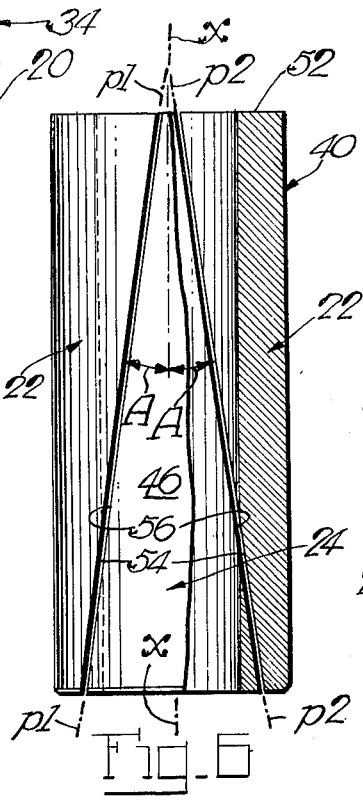
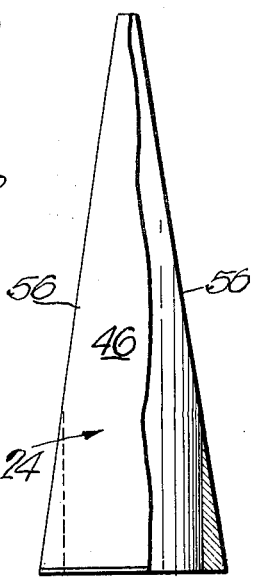
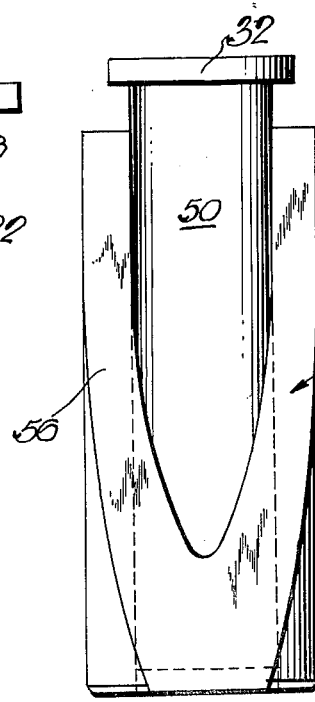
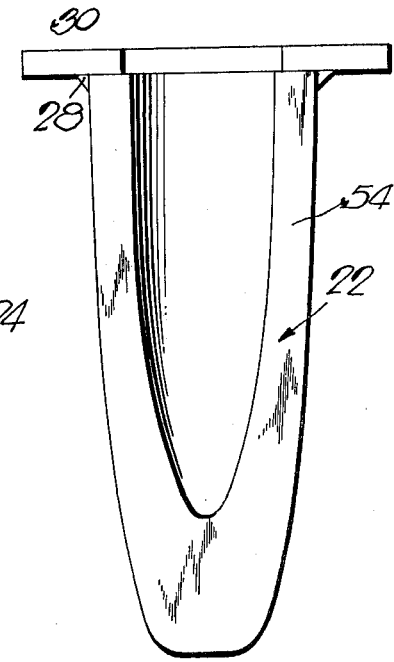

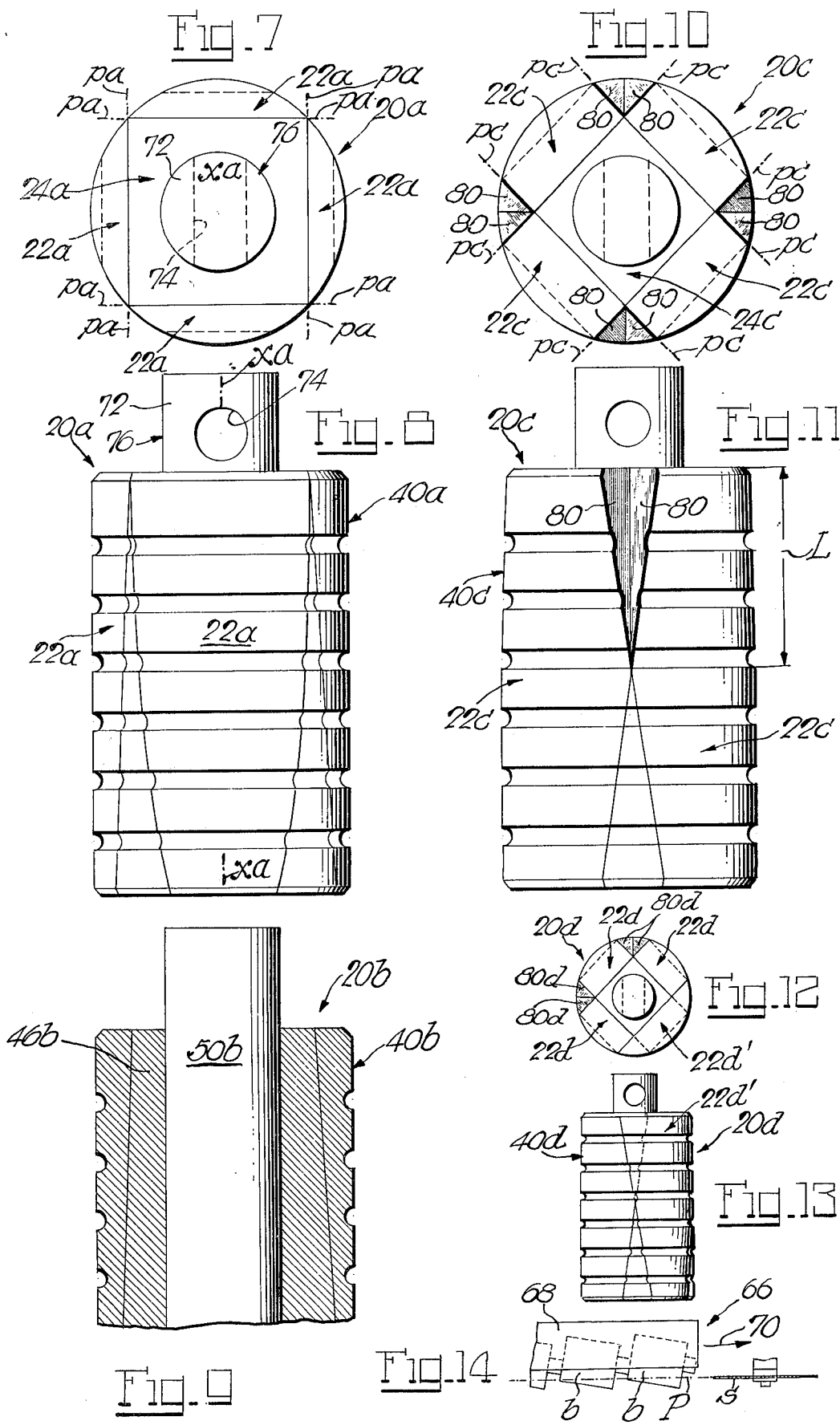

METHOD OF FORMING ANCHOR BOLTS

This invention relates to anchor bolts in general, and to a method of forming anchor bolts in particular.

The kind of anchor bolt with which the present invention is concerned provides a hollow mounting stem which for expansibility is formed at least in part of segmental prongs, and a wedge-type expander in the stem which cooperates with the prongs and is movable back and forth for expanding and contracting the prongs, with an end of the expander being in the form of an anchor for releasable attachment of a load thereto.

It is a primary object of the present invention to provide an anchor bolt of this kind which is of exceedingly simple construction and especially low cost, yet is highly reliable and secure in its hold of loads of most any, including particularly large, magnitudes.

It is another object of the present invention to provide an anchor bolt of this kind having a mounting stem and an expander therefor, of which the prongs of the stem are of simple segmental section, with the plane surfaces of the prongs which subtend the cylindrical gripping surfaces thereof being wedge faces, and the expander is formed with wedge faces which are next and companions to the wedge faces of the prongs and cooperate therewith in expanding and contracting the prongs on back and forth movement of the expander.

It is another important object of the present invention to provide an anchor bolt of this kind of which the aforementioned prongs of the stem and the expander are fashioned from a cylindrical starting blank with an axis, from which each prong is formed by simply cutting the blank lengthwise along a plane at a given wedge angle to the axis, with the parts thus severed from the blank being the prongs with the aforementioned cylindrical gripping surfaces and wedge faces, whereby on severance of all prongs from the blank the remainder of the latter forms the expander with the aforementioned wedge faces, and one end of the expander is in the form of an anchor to which a load is releasably attachable and through intermediation of which the expander is moved back and forth in expanding and contracting the prongs.

It is a further important object of the present invention to provide an anchor bolt of this kind, of which the aforementioned starting blank is hollow and in the form of a length of ordinary pipe with an axis from which the prongs are cut as aforementioned, whereby on severance of all prongs from the pipe the remainder of the latter is an expander sleeve with the wedge faces of the expander thereon, and the expander being finished by inserting and suitably securing in the sleeve a center post in the simple form of a length of plain round bar stock of which one end may, moreover, be formed as a mount for an anchor prior or subsequent to the mount of the center post in the expander sleeve.

Another important object of the present invention is to provide an anchor bolt of this kind, of which the aforementioned starting blank is, alternatively, in the form of a piece of ordinary solid bar stock, of which an endlength may be reduced in diameter and conveniently drilled with a hole to form an anchor, and the remaining greater length may be formed into the prongs and expander of an anchor bolt in accordance with the invention.

Further objects and advantages will appear to those skilled in the art from the following, considered in conjunction with the accompanying drawings.

In the accompanying drawings, in which certain modes of carrying out the invention are shown for illustrative purposes:

FIG. 1 is an elevational view of an anchor bolt made according to the invention;

FIGS. 2 to 4 are elevational views of the prongs and an expander of the anchor bolt of FIG. 1;

FIG. 5 shows, partly in elevation and partly in section, the partly formed expander of the same anchor bolt;

FIG. 6 shows, partly in elevation and partly in section, a tubular starting blank and its formation by cutting into the prongs and partly formed expander of the same anchor bolt;

FIGS. 7 and 8 are top and elevational views of a modified anchor bolt formed according to the invention from a starting blank of solid bar stock;

FIG. 9 is a longitudinal section through an anchor bolt similar to that of FIGS. 7 and 8, but formed from a starting blank of exemplary tubular pipe;

FIGS. 10 and 11 are top and elevational views of another modified anchor bolt the prongs of which are partly cut away in their formation in accordance with the invention;

FIGS. 12 and 13 are reduced top and elevational views of a further modified anchor bolt formed according to the invention; and FIG. 14 is a diagrammatic view of an installation in which to form anchor bolts according to the invention.

Referring to the drawings, and more particularly to FIGS. 1 to 6 thereof, the reference numeral 20 designates an anchor bolt which has for its major parts plural, in this instance two, outer gripping prongs 22, a common inner expander 24, and an anchor 26. Secured to the upper ends of the prongs 22, as by welding 28, are companion halves 30 of a collar, while the anchor 26 is formed in this instance by a base 32 and a piece of chain 34 of which part of a link 36 is suitably secured to the base 32.

The present invention features a method of forming the prongs 22 and expander 24 of an anchor bolt from a cylindrical starting blank 40 which in this instance is hollow and may be a length of cut-off tubular stock, such as preferred steel pipe. The blank 40 may initially be grooved peripherally as at 42 to provide the prongs 22 to-be-formed with peripheral surfaces 44 that afford a good grip.

The formation of the prongs 22 and expander 24 merely involves lengthwise cutting the blank 40 along planes p1 and p2 which subtend two different parts of the blank periphery, and in this instance two identical and diametrically opposite parts thereof, thereby dividing the blank into the prongs 22 (FIGS. 3,4 and 6) and an expander core 46 (FIGS. 5 and 6). For the sake of simplicity, the peripheral grooves 42 in FIG. 1 have been omitted from the parts in FIGS. 2 to 6. The expander core 46, being formed from tubular stock, is at this intermediate stage in the form of an expander sleeve (FIGS. 5 and 6). The expander sleeve 46 is finish-formed into the expander 24 by inserting and suitably securing therein, as by welding, a center post 50 which may be a piece of ordinary bar stock to the top end of which may be secured, conveniently by welding, a steel washer which forms the base 32 of the anchor 26 that may be finished by the addition of the exemplary chain piece 34. The companion halves 30 of the top collar may also be secured by welding 28 to the top ends of the prongs 22 (FIG. 1).

The planes p1 and p2 along which the blank 40 is cut are inclined inwardly toward the top end 52 of the blank and form identical wedge angles A with the axis x of the blank, so that the prongs and expander have plane companion wedge faces 54 and 56, respectively, and the prongs have in this instance identical cylindrical gripping surfaces 44.

The blank 40 is cut along the exemplary planes p1 and p2 in any suitable fashion, as by sawing, for example. Thus, a saw of preferred rotary type may be used in cutting the blank first along one plane p1 and then along the other plane p2, or the blank may be cut along both planes nearly simultaneously by holding the blank stationary and advancing a saw into the blank along each plane, with one saw trailing the other sufficiently for run-out of the leading saw at the top end 52 of the blank and retraction of this saw without interference from the other saw. Recourse may also be had to an installation 66 in FIG. 14 for fairly efficient mass production of anchor bolts. This installation contemplates a jig 68 for holding a multitude of exemplary blanks b in orderly fashion, with the jig being automatically fed in the direction of the arrow 70 at an appropriate rate past a rotary power saw s to cut the blanks along the plane P for the separation of a first prong from each blank. The blanks are then turned in the jig for bringing the next prongs-to-be into line with the plane P, whereupon the jig is again fed past the saw s for cutting the second prong from each blank. This is repeated until all prongs are separated, leaving nothing but prongs and the associated expanders, as will be readily understood.

Reference is now had to FIGS. 7 and 8 which show a modified anchor bolt 20a the prongs 22a and expander 24a of which may be formed similarly as the prongs 22 and expander 24 of the bolt 20 in FIG. 1, except that the prongs and expander of the present anchor bolt 20a are formed from a cylindrical blank which in this instance is of solid bar stock. To begin with, a short endlength of the blank may be diametrically reduced in any suitable fashion, as by machining, for example, to form a top shank 72 into which a hole 74 may be drilled to form an exemplary anchor 76. The remaining blank 40a is in this instance cut lengthwise along four planes pa which subtend equal and equi-angularly spaced peripheral parts of the blank that form, on separation from the blank, the identical prongs 22a and leave the expander 24a. The planes pa along which the blank is cut are inclined inwardly toward the top of the blank and form identical wedge angles with the axis xa of the blank, leaving the prongs 22a and expander 24a with companion wedge faces and the prongs with identical cylindrical gripping surfaces, as will be understood.

Reference is now had to FIG. 9 which shows an anchor bolt 20b that may be like, and be formed like, the exemplary anchor bolt 20a of FIGS. 7 and 8, except that the starting blank 40b of the present anchor bolt 20b is of tubular stock, requiring the insertion and securement in the expander sleeve 46b of a center post 50b.

Reference is next had to FIGS. 10 and 11 which show another modified anchor bolt 20c the prongs 22c and expander 24c of which are also formed according to the featured method. Thus, the present anchor bolt 20c is much like the anchor bolt 20a of FIGS. 7 and 8 and is formed quite similarly as the latter bolt, with the significant difference, however, that the blank 40c of the present bolt is cut lengthwise along planes pc which over a top length L of the blank intersect each other to leave parts of opposite sides of the separated prongs 22c cut away as at 80. In forming the prongs 22c by successive cuts in the blank, the first prong thus separated from the blank would have its opposite sides intact, i.e., uncut, but its opposite sides can subsequently be cut for symmetry of all prongs.

Reference is finally had to FIGS. 12 and 13 which show a further anchor bolt 20d that is exactly like, and formed like, the anchor bolt 20c of FIGS. 10 and 11, except that the first prong 22d' separated from the blank 40d, which is left with its opposite sides uncut, is not subsequently cut for symmetry with the other prongs 22d whose opposite sides were partly cut away as at 80d in the course of separation of the latter prongs from the blank.

What is claimed is:

1. The method of making an anchor bolt with outer prongs and an inner expander, which comprises lengthwise cutting a cylindrical metal blank with an axis in first planes which subtend different parts of the blank periphery and are inclined inwardly to one end of the blank at identical wedge angles to said axis to thereby separate the blank into different prongs and an expander with a narrow end, with said prongs and expander having plane companion wedge faces, respectively, and said prongs having cylindrical gripping surfaces, and then securing to said expander an anchor at said narrow end.

2. The method of claim 1 in which said first planes subtend equi-angularly spaced parts of the blank periphery.

3. The method of claim 2, in which said parts of the blank periphery are of equal angular extent.

4. The method of claim 1, in which said blank is cut by sawing.

5. The method of claim 1, in which said blank is of tubular form so that said expander is of sleeve form, and said method further comprises inserting in and securing to said expander sleeve a piece of round bar to serve as a mount for said anchor.

* * * * *